(12) United States Patent
Spryshak et al.

(10) Patent No.: US 10,370,882 B2
(45) Date of Patent: Aug. 6, 2019

(54) INJECTION MOLDED HOUSING

(71) Applicant: Valeo Climate Control Corp., Auburn Hills, MI (US)

(72) Inventors: Joseph Spryshak, Hartland, MI (US); Joe Thompson, Birmingham, MI (US); Jason Kreucher, Macomb, MI (US)

(73) Assignee: Valeo Climate Control Corp., Auburn Hills, MI (US)

(*) Notice: Subject to any disclaimer, the term of this patent is extended or adjusted under 35 U.S.C. 154(b) by 430 days.

(21) Appl. No.: 15/136,924

(22) Filed: Apr. 23, 2016

(65) Prior Publication Data

US 2017/0306670 A1    Oct. 26, 2017

(51) Int. Cl.
| | |
|---|---|
| *E05D 7/00* | (2006.01) |
| *B29C 45/00* | (2006.01) |
| *F24F 13/20* | (2006.01) |
| *B29L 31/30* | (2006.01) |
| *B29L 31/00* | (2006.01) |

(52) U.S. Cl.
CPC ............ *E05D 7/00* (2013.01); *B29C 45/0053* (2013.01); *F24F 13/20* (2013.01); *B29L 2031/30* (2013.01); *B29L 2031/779* (2013.01); *E05Y 2900/60* (2013.01)

(58) Field of Classification Search
CPC ........ E05D 7/00; F24F 13/20; B29C 45/0053; E05Y 2900/60; B29L 2031/779; B29L 2031/30; F16B 5/0004; F16B 5/0008; F16B 5/0012; F16B 5/0048; F16B 5/0092; F16B 5/06; F16B 5/0607; F16B 5/0621; F16B 5/0664; F16B 5/0678; F16B 5/12; F16B 5/126; F16B 21/02; F16B 21/06
See application file for complete search history.

(56) References Cited

U.S. PATENT DOCUMENTS

| 670,032 A | 3/1901 | Parmentier |
|---|---|---|
| 3,466,076 A | 9/1969 | Bisbing |

(Continued)

FOREIGN PATENT DOCUMENTS

| CN | 104482643 | 4/2015 | |
|---|---|---|---|
| DE | 19923641 A1 * | 11/2000 | ................ F16B 2/22 |
| EP | 1970231 | 9/2008 | |

OTHER PUBLICATIONS

Espacenet Translation to English for DE19923641. accessed Nov. 13, 2018. (Year: 2000).*

*Primary Examiner* — Nancy R Johnson
(74) *Attorney, Agent, or Firm* — Dierker & Kavanaugh, P.C.

(57) ABSTRACT

An injection molded housing includes a first piece, a second piece, and a wall defined by the first piece removably joined to the second piece by a joint at abutting surfaces of the first piece and the second piece. A central catch is integrally molded with the first piece, protruding from the wall. A latch is integrally molded with the second piece, and connected to the second piece first and second living hinges. A half-knuckle is integrally molded with the second piece, protruding from the wall. A hinge pin is fixedly attached to the latch. The latch is bendable at the living hinges to align the hinge pin with the half-knuckle. The latch is rotatable about the hinge pin to engage the central catch and selectably prevent the first piece from being disengaged from the second piece.

18 Claims, 11 Drawing Sheets

(56) References Cited

U.S. PATENT DOCUMENTS

| | | | |
|---|---|---|---|
| 4,522,312 A * | 6/1985 | Rathgeber | A45C 13/1084 |
| | | | 220/324 |
| 4,698,882 A * | 10/1987 | Lang | F16B 5/126 |
| | | | 24/289 |
| 7,036,825 B2 | 5/2006 | Pettitt et al. | |
| 9,187,210 B2 | 11/2015 | Zhu et al. | |
| 2011/0017742 A1 | 1/2011 | Sausen et al. | |

* cited by examiner

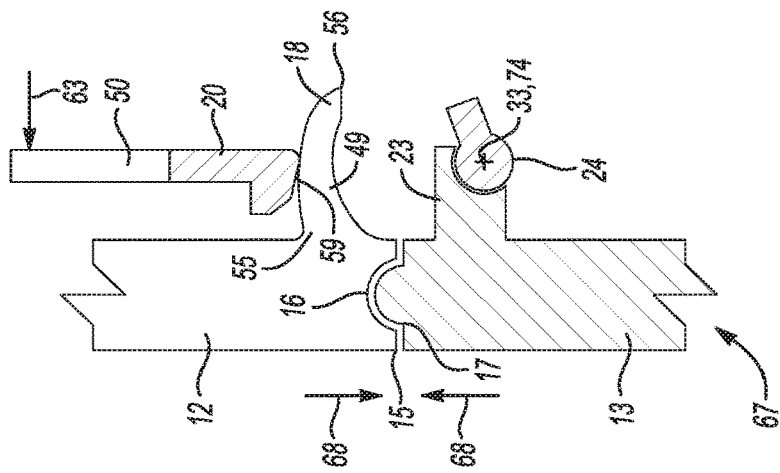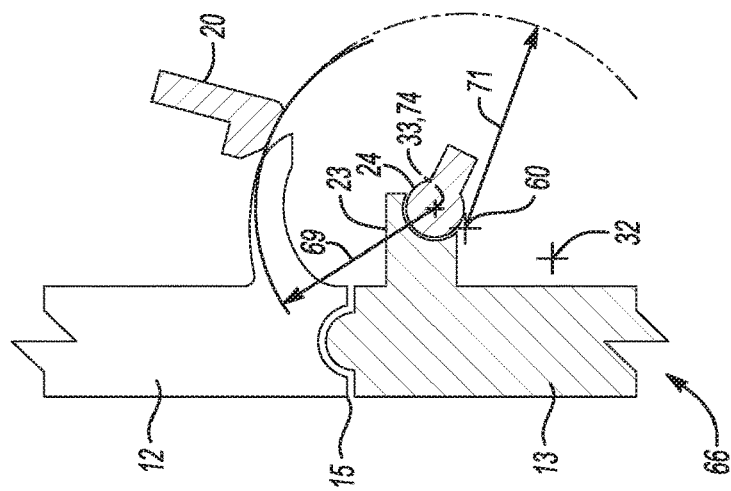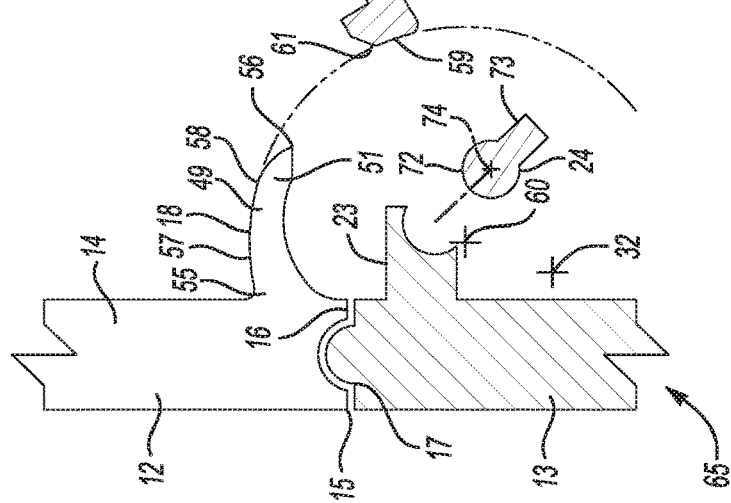

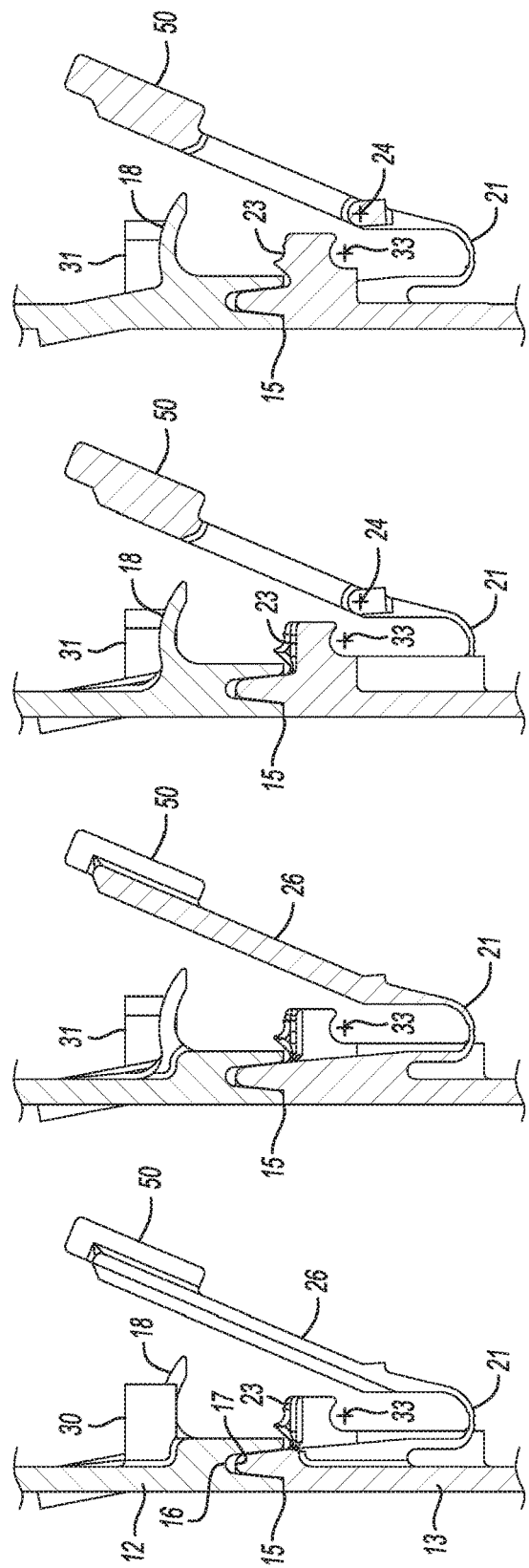

INJECTION MOLDED HOUSING

BACKGROUND

HVAC (Heating Ventilation and Air Conditioning) systems are used for climate control of, e.g., internal cabin areas of an automobile. HVAC systems may be configured with an HVAC unit having a heat exchanger disposed in a housing. An HVAC distribution system may be operatively connected to the HVAC unit. An HVAC system may have one or more air flow paths for allowing air to flow, for example, to, from, and/or within the HVAC unit and the HVAC distribution system. Doors may be associated with the air flow path for controlling the amount of air flowing to, through, and/or from the HVAC unit and/or the HVAC distribution system.

Some HVAC units have a housing made by assembling two injection molded plastic housing pieces. The injection molded plastic housing pieces must mate in accordance with close tolerance geometry. The process by which the housings are cooled when they exit the injection mold die significantly influences the warping of the housing pieces. Some HVAC housings are made by molding the mating housing pieces simultaneously, and then immediately following the mold process, putting the hot mating pieces together so that they cool with mating features engaged, thereby preventing the mating features from hardening out of shape. After the housing pieces cool, the mating pieces are separated for installation of components like an evaporator, heater core, blend doors, etc. After the components are installed, the housing pieces are once again mated together and fastened.

SUMMARY

An injection molded housing includes a first piece, a second piece, and a wall defined by the first piece removably joined to the second piece by a tongue and groove joint at abutting surfaces of the first piece and the second piece. A central catch is integrally molded with the first piece, protruding from the wall. A latch is integrally molded with the second piece, and connected to the second piece first and second living hinges. A half-knuckle is integrally molded with the second piece, protruding from the wall. A hinge pin is fixedly attached to the latch. The latch is bendable at the living hinges to align the hinge pin with the half-knuckle. The latch is rotatable about the hinge pin to engage the central catch and selectably prevent the first piece from being disengaged from the second piece.

BRIEF DESCRIPTION OF THE DRAWINGS

Features of examples of the present disclosure will become apparent by reference to the following detailed description and drawings, in which like reference numerals correspond to the same or similar, though perhaps not identical, components. For the sake of brevity, reference numerals or features having a previously described function may or may not be described in connection with other drawings in which they appear.

FIG. 4A is a cross-sectional view along line 4A-4A indicated in FIG. 2, with the hinge pin disengaged from the half-knuckle according to the present disclosure;

FIG. 4B is a cross-sectional view similar to that of FIG. 4A, but showing the hinge pin engaged in the half-knuckle and the latch beginning to engage the central catch;

FIG. 4C is a cross-sectional view similar to that of FIG. 4A, but showing the hinge pin engaged in the half-knuckle and the latch engaged with the central catch;

FIG. 14 is a semi-schematic cross-sectional view of the example of the portion of the injection molded housing depicted in FIG. 7, with the section taken as indicated at line 14-14 in FIG. 7;

FIG. 15 is a semi-schematic cross-sectional view of the example of the portion of the injection molded housing depicted in FIG. 7, with the section taken as indicated at line 15-15 in FIG. 7;

FIG. 16 is a semi-schematic cross-sectional view of the example of the portion of the injection molded housing depicted in FIG. 7, with the section taken as indicated at line 16-16 in FIG. 7; and FIG. 17 is a semi-schematic cross-sectional view of the example of the portion of the injection molded housing depicted in FIG. 7, with the section taken as indicated at line 17-17 in FIG. 7.

DETAILED DESCRIPTION

Figure 1:
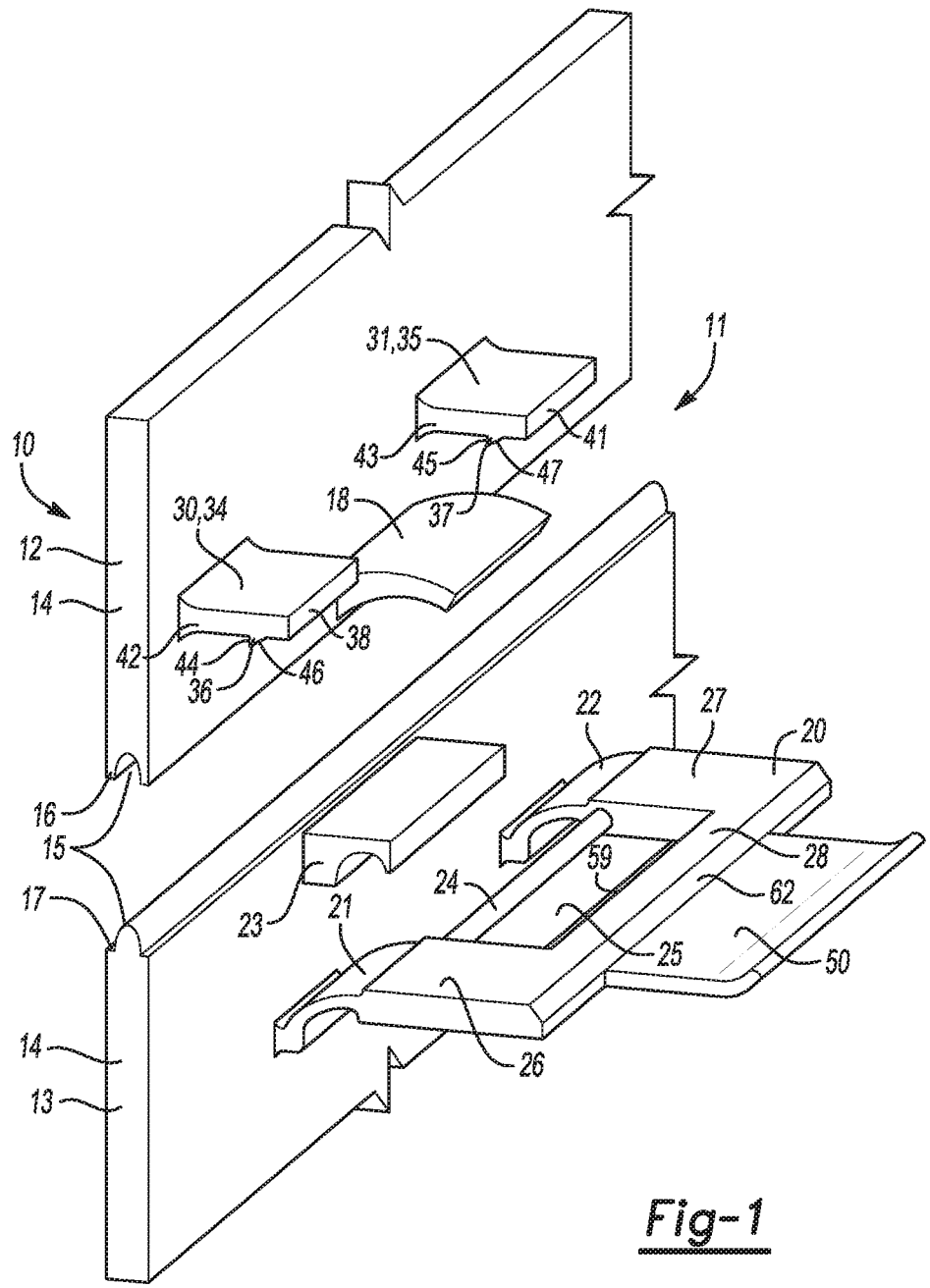
FIG. 1 is a semi-schematic exploded perspective view of an example of a portion of an injection molded housing including a first piece and a second piece with a fastening system according to the present disclosure.

Some automotive HVAC housings have a tongue and groove joint to create an air tight seal between separate plastic housing parts. Although the description has examples of HVAC housings, the present disclosure may be used in any product that has at least two plastic components that are assembled to each other. When the two plastic components contact in the plane of a wall and create a seal that isolates what is inside the wall from what is outside the wall.

Examples of the present disclosure advantageously provide benefit to injection molded plastic housings that must mate in accordance with close tolerance geometry. In such examples, the process by which the housings are cooled when the housings exit the injection mold die significantly influences the warping of the parts. The injection molded parts that mate together may be molded simultaneously. Immediately following the mold process, the hot mating pieces may be mated together so that the mating pieces cool with the mating features engages and preventing each other from hardening out of shape.

In HVAC the cooled parts are separated to insert components such as an evaporator, heater core, and blend doors. Then the housings are once again mated together and fastened.

According to the present disclosure, the fastening mechanism is part of the mating pieces of the plastic housing to avoid additional parts and additional cost. Hence, some existing housing have snap-fit plastic clips molded into the mating pieces of the housing. The existing snap-fit plastic clips may engage during the cooling process when the mating housings are staged together. The existing housings then cannot be separated easily to complete the HVAC assembly process.

Although examples of the present disclosure are depicted and described having a tongue and groove joint, it is to be understood that other types of joints are contemplated herein. The joint can be any suitable joint between mating pieces of a plastic housing. Additional examples of a suitable joint are: a butt joint, a flange joint, a loose tongue/spline joint and a miter joint. The joint may or may not include a gasket or sealant.

Snap-fit designs have replaced screws in many cases, but do not perform the function of compressing the joint and making a seal as well as a screw. Hence, more air leakage can occur at the joint, which is not desirable.

For some HVAC applications, molded-in fasteners may have a snap feature that engages to connect one housing into another when parts of a tongue and groove joint are brought into certain proximity to each other. In the existing HVAC applications, it is impossible for the tongue and groove to be fully engaged without the snap feature also engaging and thereby preventing the two housings from separating afterward.

The currently available HVAC housings also do not provide a means for forcing the separate housings together, which is desirable for creating a seal at the joint. Once the existing snap engages, the compressing force on the joint relaxes to some extent, which reduces the seal quality.

Figure 2:
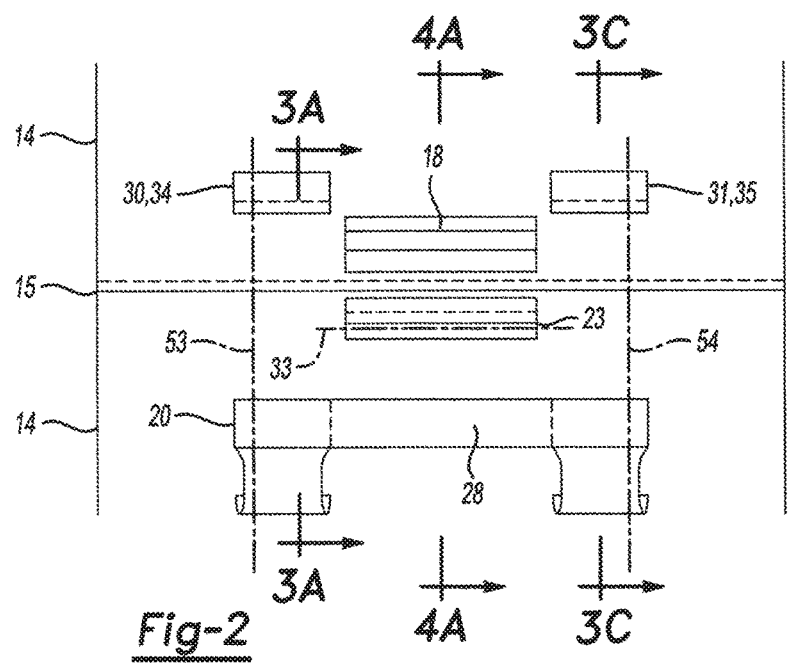
FIG. 2 is a semi-schematic front view of the example of the portion of the injection molded housing depicted in FIG. 1.

FIG. 1 is a semi-schematic exploded perspective view of an example of a portion of an injection molded housing 10 including a first piece 12 and a second piece 13 with a fastening system 11 according to the present disclosure. FIG. 2 is a semi-schematic front view of the example of the portion of the injection molded housing 10 with the fastening system 11 depicted in FIG. 1. The injection molded housing 10 includes the first piece 12, the second piece 13 and a wall 14 defined by the first piece 12 removably joined to the second piece 13 by a tongue and groove joint 15 at respective abutting surfaces 16, 17 of the first piece 12 and the second piece 13.

The injection molded housing 10 and fastening system 11 further include a central catch 18 integrally molded with the first piece 12, protruding from the wall 14. A latch 20 is integrally molded with the second piece 13. The latch 20 is connected to the second piece 13 by a first living hinge 21 and a second living hinge 22. A half-knuckle 23 is integrally molded with the second piece 13. As used herein, a half-knuckle means one side of a hinged joint having a curved portion that engages a hinge pin. The half-knuckle 23 protrudes from the wall 14. A hinge pin 24 is fixedly attached to the latch 20. In the example depicted in FIGS. 1-4C, a hinge pin 24 spans an aperture 25 in the latch 20. The hinge pin 24 may be a cantilever peg (not shown) fixedly attached to the latch 20. There may be 2 or more cantilever pegs (not shown) projecting inwardly, outwardly, or both inwardly and outwardly. The latch 20 is bendable at the living hinges 21, 22 to align the hinge pin 24 with the half-knuckle 23. (See FIG. 4A.) As depicted in FIG. 4B and FIG. 4C, the latch 20 is rotatable about the hinge pin 24 to engage the central catch 18 and selectably prevent the first piece 12 from being disengaged from the second piece 13.

As shown in FIG. 1, in examples of the present disclosure, the latch 20 may include a first leg 26 extending from the first living hinge 21. Similarly, a second leg 27 may extend from the second living hinge 22. In the example depicted in FIGS. 1-4C, the aperture 25 is between the first leg 26 and the second leg 27. In other examples, a wall or panel (not shown) may cover the aperture 25 as long as the hinge pin 24 is not blocked from the half-knuckle 23. A bridge 28 connects the first leg 26 and the second leg 27. In the example depicted in FIGS. 1-4E, the bridge 28 spans the aperture 25 between the first leg 26 and the second leg 27. A first retention clip 30 and a second retention clip 31 are integrally molded with the first piece 12 to allow the latch 20 to engage the central catch 18 and to selectably prevent the latch 20 from disengaging from the central catch 18. The first retention clip 30 and the second retention clip 31 bend out of the way to allow the latch 20 to engage the central catch 18, then snap back to lock the latch 20 in place.

Figures 3A, 3B:
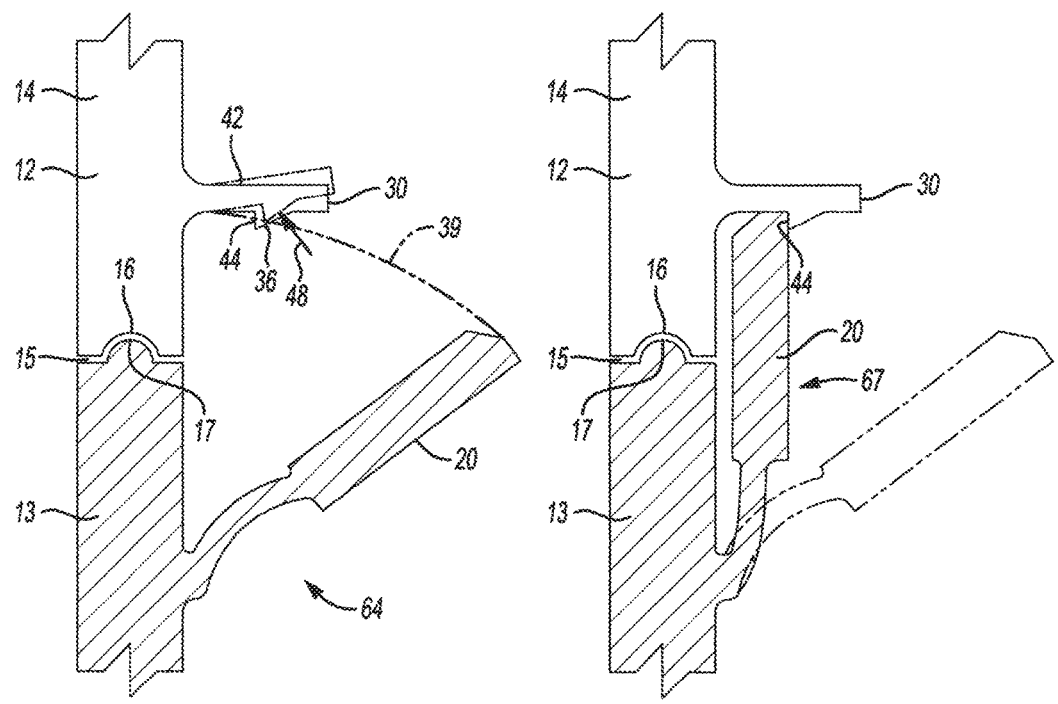
FIG. 3A is a cross-sectional view taken along line 3A-3A indicated in FIG. 2, with the first retention clip disengaged according to the present disclosure.
FIG. 3B is a cross-sectional view similar to that of FIG. 3A, but showing the first retention clip engaged according to the present disclosure.
Figure 3C:
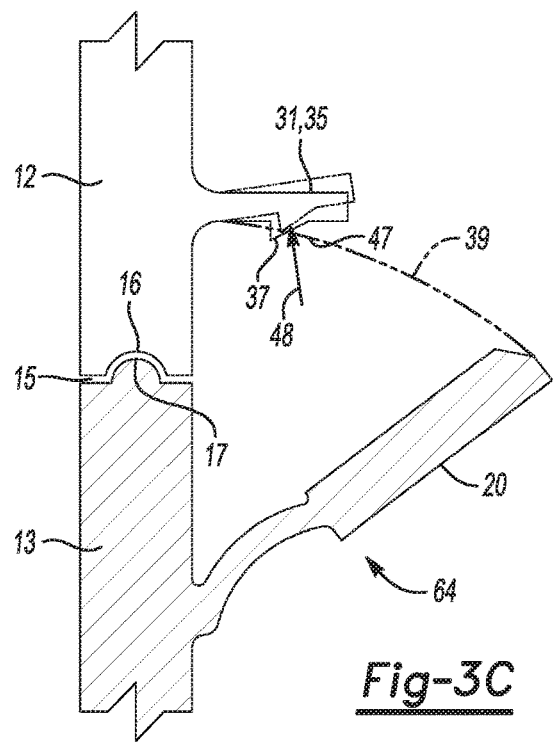
FIG. 3C is a cross-sectional view taken along line 3C-3C indicated in FIG. 2, with the second retention clip disengaged according to the present disclosure.
Figure 3D:
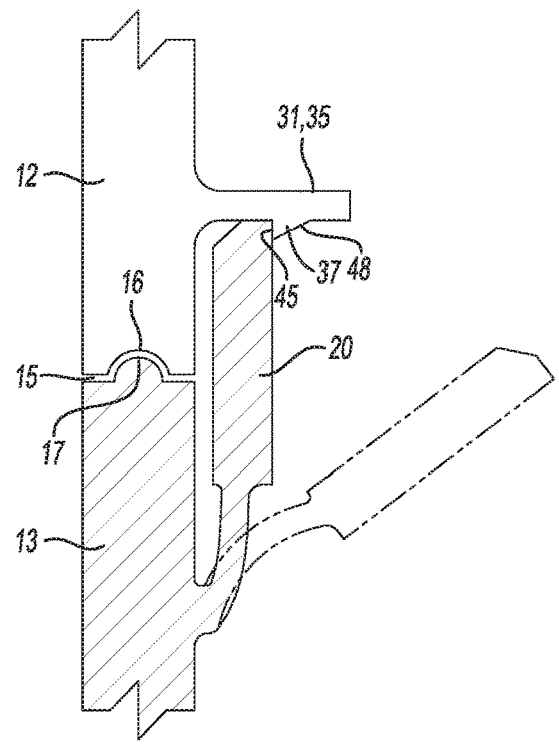
FIG. 3D is a cross-sectional view similar to that of FIG. 3C, but showing the second retention clip engaged according to the present disclosure.
Figure 4E:
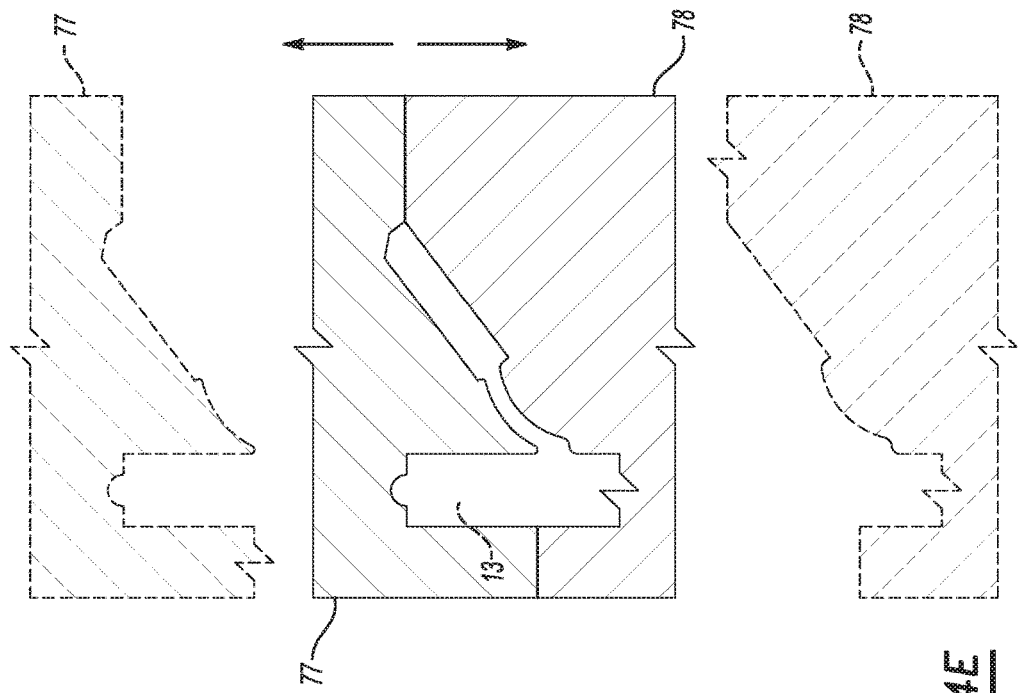
FIG. 4E is a cross-sectional view depicting an example of the molds that form the second piece shown in FIG. 2 with the molds pulling from the top and bottom without requiring slides according to the present disclosure.
Figure 4D:
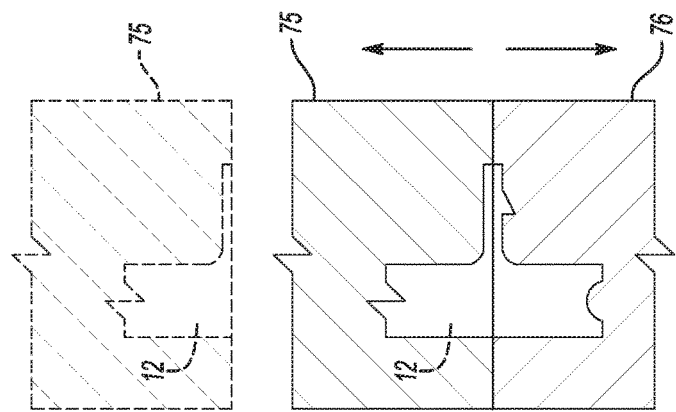
FIG. 4D is a cross-sectional view depicting an example of the molds that form the first piece shown in FIG. 2 with the molds pulling from the top and bottom without requiring slides according to the present disclosure.

In examples, the latch 20 has a first operational state 64, a second operational state 65, a third operational state 66, and a fourth operational state 67 each further described below. FIGS. 3A and 3C depict the latch 20 in the first operational state 64. In the first operational state 64 of the latch 20, the first piece 12 is removably joinable to the second piece 13 by the tongue and groove joint 15 at abutting surfaces 16, 17 of the first piece 12 and the second piece 13 without displacing the latch 20 from a free state. The free state is the state a resilient object attains when all spring energy is released. To illustrate, a force can be applied to a spring to cause the spring to compress and store energy. When the spring is released, the spring will release the stored energy and move back to an uncompressed state. The state that the spring settles to with no force applied is the free state. The first operational state 64 is the "as molded" state of the latch 20. In the first operational state 64, the latch 20 is in the free state, and the latch 20 does not hold the first piece 12 to the second piece 13. This allows the hot mating pieces 12, 13 to be mated together immediately after molding so that the mating pieces 12, 13 cool with the mating features (e.g. the tongue and groove joint 15) engaged to prevent the mating pieces 12, 13 from warping and hardening in a way that would prevent the two pieces 12, 13 from being mated together. While cooling, examples of the mating pieces 12, 13 may be held together by placing a weight on top of them or by using a large elastic band. In other examples, gravity supplies ample force to hold the mating pieces 12, 13 together while cooling.

FIG. 4A is a cross-sectional view taken through the location indicated in FIG. 2, with the hinge pin 24 disengaged from the half-knuckle 23 according to the present disclosure. In the example depicted in FIG. 4A, the hinge pin 24 has a cylindrical bearing surface 72 and a stiffening rib 73. The cylindrical bearing surface 72 defines a hinge pin axis 74 at a center of the cylindrical bearing surface 72. The stiffening rib 73 projects radially from center of the cylindrical bearing surface 72 to stiffen the hinge pin 24. In the second operational state 65 of the latch 20, the latch 20 is rotatable via the living hinges 21, 22 about a first hinge axis 32 to align the hinge pin 24 with the half-knuckle 23 for engagement therewith.

The central catch 18 is a curved cantilever beam 49 having a fixed end 55 attached to the wall 14 and a cantilever free end 56 distal to the fixed end 55. The central catch 18 has a convex surface 57. With the first piece 12 and the second piece 13 seated together, the latch 20 can rotate to engage the central catch 18. The convex surface 57 has a cylindrical contact surface 58. The cylindrical contact surface 58 is a portion of a cylinder, not an entire cylinder. The cylinder is continued in phantom line in FIG. 4A-FIG. 4C. The center of the cylinder is marked at reference numeral 60. The cylindrical contact surface 58 has a radius 71. The convex surface 57 has a curved lead-in surface 51 at the cantilever free end 56. The bridge 28 has a bridge contact surface 59 to contact the convex surface 57. The bridge 28 is chamfered at a leading edge 61 of the bridge contact surface 59.

FIG. 4B is a cross-sectional view taken through the location indicated in FIG. 2, with the hinge pin 24 engaged in the half-knuckle 23 and the latch 20 beginning to engage the central catch 18. The third operational state 66 of the latch 20 has at least 4 characteristics: 1) The hinge pin 24 is engaged with the half-knuckle 23. 2) The latch 20 is rotatable about a second hinge axis 33, parallel to and spaced from the first hinge axis 32. 3) The second hinge axis 33 is located by the hinge pin 24 engaged with the half-knuckle 23. 4) The second hinge axis 33 is coaxial to the hinge pin 24.

FIG. 4C is a cross-sectional view taken through the location indicated in FIG. 2, with the hinge pin 24 engaged in the half-knuckle 23 and the latch 20 fully engaging the central catch 18. In the fourth operational state 67 of the latch 20, the hinge pin 24 is engaged with the half-knuckle 23, the latch 20 is engaged with the central catch 18, and the first retention clip 30 and the second retention clip 31 selectably prevent the latch 20 from disengaging from the central catch 18. (See FIG. 3B.)

As best seen in FIG. 1, the thumb lever 50 may be integrally molded with the bridge 28. The thumb lever 50 extends from an end 62 of the bridge 28 opposite to the bridge contact surface 59 to reduce a locking force 63 to move the latch 20 from the third operational state 66 to the fourth operational state 67. The bridge contact surface 59 also presents a relatively large surface area for the application of the force 63. In an example, the surface area may be about 1 square centimeter or more. The relatively large surface area reduces a pressure experienced by the fingers of a human operator; thereby improving comfort for the human operator.

The second hinge axis 33 is spaced from the center of curvature 60 of the cylindrical contact surface 58. The bridge contact surface 59 rotates about second hinge axis 33 at a smaller radius 69 than the cylindrical radius 71 of the cylindrical contact surface 58. The difference between the radii of curvature 69, 71, and the eccentricity of the second hinge axis 33 relative to the center of curvature 60 of the cylindrical contact surface 58 causes an increase in a clamping force 68 (FIG. 4C) on the abutting surfaces 16, 17 of the first piece 12 and the second piece 13 as the latch 20 is rotated from the cantilever free end 56 of the curved cantilever beam 49 toward the fixed end 55 of the curved cantilever beam 49.

Still referring to the example of the present disclosure depicted in FIGS. 1-4C, the first retention clip 30 includes a first pawl 34, a first pawl catch 36, a first resilient stem 42, a first deflector face 46, and a first pawl catch face 44. The first pawl 34 extends from the wall 14. The first pawl catch 36 is disposed on a first free end 38 of the first pawl 34, distal to the wall 14. The first resilient stem 42 is defined between the wall 14 and the first pawl catch 36. The first deflector face 46 is defined oblique to the path 39 of the latch 20 on the first pawl catch 36 to deflect the first pawl catch 36 from a path 39 of the latch 20 when the latch 20 applies a deflecting force 48 on the first deflector face 46 to resiliently bend the first resilient stem 42. The first pawl catch face 44 is defined orthogonal to the path 39 of the latch 20 on the first pawl catch 36. The first resilient stem 42 urges the first pawl catch 36 to a first blocking position to block movement of the latch 20 in a direction away from the wall 14 as depicted in FIG. 3B. It is to be understood that the terms "first" and "second" in "first blocking position" and "second blocking position" are used herein to differentiate the blocking position of the first pawl catch 36 from the blocking position of the second pawl catch 37. As such, the terms "first" and "second" in this context do not indicate order of attainment of the "first blocking position" and "second blocking position". The "first blocking position" and the "second blocking position" may occur simultaneously, since the terms "first" and "second" in this context do not refer to time or order.

Still referring to the example depicted in FIGS. 1-4C, the second retention clip 31 is similar to the first retention clip 30. The second retention clip 31 includes a second pawl 35, a second pawl catch 37, a second resilient stem 43, a second deflector face 47, and a second pawl catch face 45. The second pawl 35 extends from the wall 14. The second pawl catch 37 is disposed on a second free end 41 of the second pawl 35, distal to the wall 14. The second resilient stem 43 is defined between the wall 14 and the second pawl catch 37. The second deflector face 47 is defined oblique to the path 39 of the latch 20 on the second pawl catch 37 to deflect the second pawl catch 37 from the path 39 of the latch 20 when the latch 20 applies a deflecting force 48 on the second deflector face 47 to resiliently bend the second resilient stem 43. The second pawl catch face 45 is defined orthogonal to the path 39 of the latch 20 on the second pawl catch 37. The second resilient stem 43 urges the second pawl catch 37 to a second blocking position to block movement of the latch 20 in a direction away from the wall 14. (See FIG. 3D.)

In the example depicted in FIGS. 1-4C, the first retention clip 30 and the second retention clip 31 bend up and down as best seen in FIG. 3A and FIG. 3C. The first resilient stem 42 is resiliently bendable in a first bending plane 53. The first bending plane 53 is perpendicular to the wall 14. The edge of the first bending plane 53 is shown in FIG. 2. The first bending plane 53 is orthogonal to the second hinge axis 33. The second resilient stem 43 is resiliently bendable in a second bending plane 54. The second bending plane 54 is parallel to the first bending plane 53. The second bending plane 54 is perpendicular to the wall 14. The edge of the second bending plane 54 is shown in FIG. 2. The first resilient stem 42 and the second resilient stem 43 are resiliently bendable in the same direction. In examples of the present disclosure, the first resilient stem 42 and the second resilient stem 43 may bend in any suitable direction.

It should be noted that FIGS. 1-4C show an example of the present disclosure which may advantageously be molded such that the molds create all of the features shown and pull from the top and bottom without requiring slides. FIG. 4D is a cross-sectional view depicting an example of the first piece 12 and the molds 75, 76 that form the first piece 12 with the molds 75, 76 pulling from the top and bottom without requiring slides according to the present disclosure. FIG. 4D is a section indicated at 3C in FIG. 2; it is to be understood that all of the features of the example, including features not shown in this section view, can be molded without slides. FIG. 4E is a cross-sectional view depicting an example of the second piece 13 and the molds 77, 78 that form the second piece 13 with the molds 77, 78 pulling from the top and bottom without requiring slides according to the present disclosure. FIG. 4E is a section indicated at 3C in FIG. 2; it is to be understood that all of the features of the example, including features not shown in this section view, can be molded without slides.

Figure 5A:
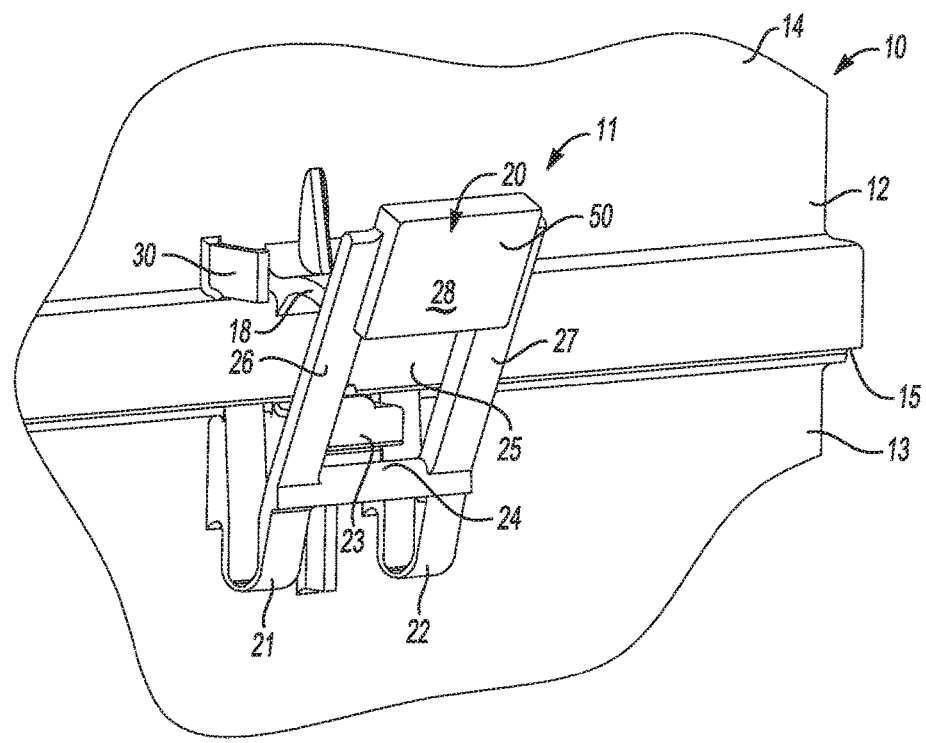
FIG. 5A is a semi-schematic perspective view of an example of a portion of an injection molded housing including a first piece and a second piece with another example of a fastening system according to the present disclosure.
Figure 5B:
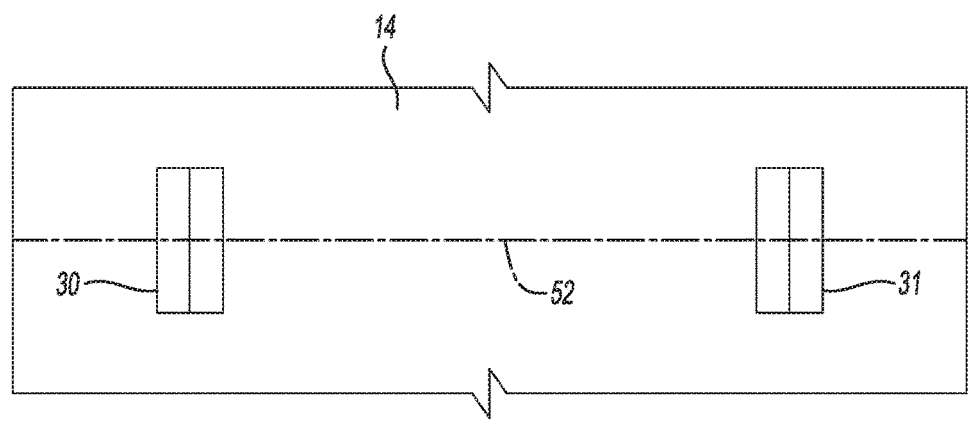
FIG. 5B is a semi-schematic partial front view of an example of a portion of the injection molded housing depicted in FIG. 5A including the first retention clip and the second retention clip according to the present disclosure.
Figure 5C:
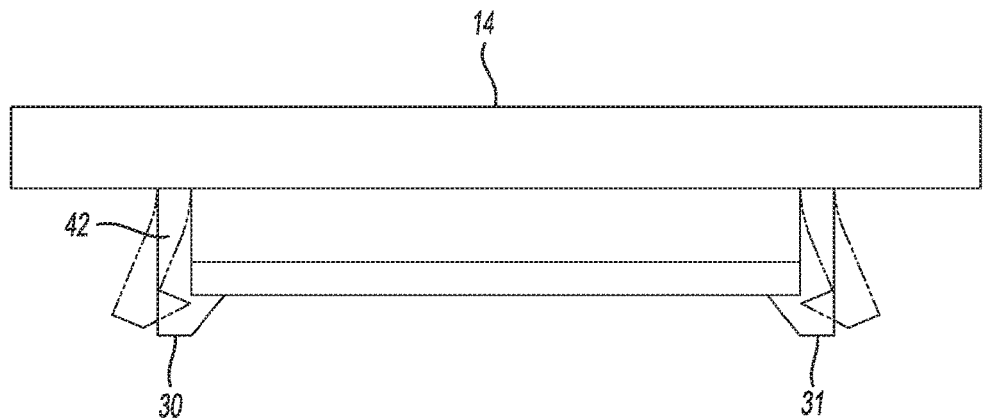
FIG. 5C is a semi-schematic partial top view of an example of a portion of an injection molded housing depicted in FIG. 5A showing the first retention clip and the second retention clip bending according to the present disclosure.

In the other example of the present disclosure depicted in FIGS. 5A-17, the first retention clip 30 and the second retention clip 31 bend side-to-side as best seen in FIG. 5C. The first resilient stem 42 is resiliently bendable in a bending plane 52. (See FIG. 5B and FIG. 7.) The bending plane 52 is parallel to the second hinge axis 33. The second resilient stem 43 is resiliently bendable in the bending plane 52. The first resilient stem 42 and the second resilient stem 43 are resiliently bendable in opposite directions. In examples of the present disclosure, the first resilient stem 42 and the second resilient stem 43 may bend orthogonally to each other (not shown).

FIG. 5A is a semi-schematic perspective view of an example of a portion of an injection molded housing 10 including a first piece 12 and a second piece 13 with a fastening system 11 according to the present disclosure. The injection molded housing 10 includes the first piece 12, the second piece 13 and a wall 14 defined by the first piece 12 removably joined to the second piece 13 by a tongue and groove joint 15 at respective abutting surfaces 16, 17 (see FIGS. 14-17) of the first piece 12 and the second piece 13.

The injection molded housing 10 and fastening system 11 further include a central catch 18 integrally molded with the first piece 12, protruding from the wall 14. A latch 20 is integrally molded with the second piece 13. The latch 20 is connected to the second piece 13 by a first living hinge 21 and a second living hinge 22. A half-knuckle 23 is integrally molded with the second piece 13. The half-knuckle 23 protrudes from the wall 14. A hinge pin 24 spans an aperture 25 in the latch 20.

As shown in FIG. 5A, in examples of the present disclosure, the latch 20 may include a first leg 26 extending from the first living hinge 21. Similarly, a second leg 27 may extend from the second living hinge 22. The aperture 25 is between the first leg 26 and the second leg 27. A bridge 28 spans the aperture 25 between the first leg 26 and the second leg 27. A first retention clip 30 and a second retention clip 31 (see e.g. FIG. 5C) are integrally molded with the first piece 12 to allow the latch 20 to engage the central catch 18 and to selectably prevent the latch 20 from disengaging from the central catch 18. The first retention clip 30 and the second retention clip 31 bend out of the way to allow the latch 20 to engage the central catch 18, then snap back to lock the latch 20 in place.

FIG. 5B is a semi-schematic partial front view of an example of a portion of the injection molded housing 10 depicted in FIG. 5A including the first retention clip 30 and the second retention clip 31 according to the present disclosure. FIG. 5B shows the edge of the bending plane 52. Any point on the first retention clip 30 or the second retention clip 31 that lies in the bending plane 52 remains in the bending plane 52 whether the first retention clip 30 or the second retention clip 31 is bent or not. This is what is meant herein by bending in a plane.

FIG. 5C is a semi-schematic partial top view of an example of a portion of an injection molded housing 10 depicted in FIG. 5A showing the first retention clip 30 and the second retention clip 31 bending side-to-side according to the present disclosure. The image of the first retention clip 30 in solid line is the relaxed position of the first retention clip 30. The clip shown in phantom line adjacent to the first retention clip 30 indicates approximately how the retention clip 31 bends to allow the latch 20 to move into position to enter the fourth operational state.

Figure 6:
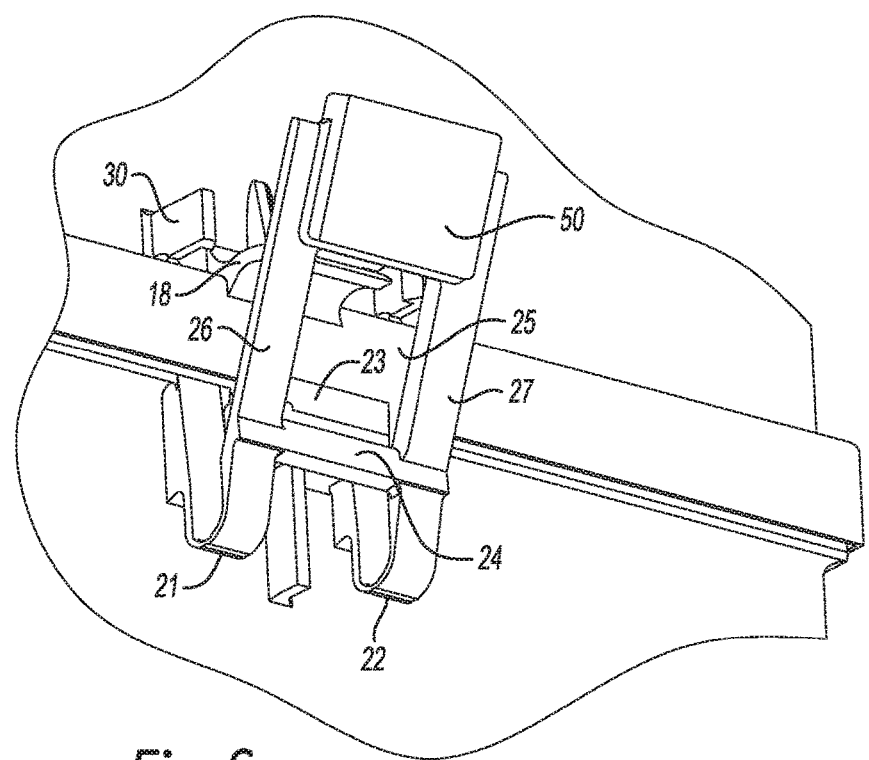
FIG. 6 is a semi-schematic lower perspective view of the example of the portion of an injection molded housing depicted in FIG. 5A according to the present disclosure.

FIG. 6 is a semi-schematic lower perspective view of the example of the portion of an injection molded housing 10 depicted in FIG. 5A according to the present disclosure. FIG. 6 shows the central catch 18, the first living hinge 21, the second living hinge 22, the half-knuckle 23, the hinge pin 24, the aperture 25, the first leg 26, the second leg 27, the first retention clip 30 and the thumb lever 50 as described above.

Figure 7:
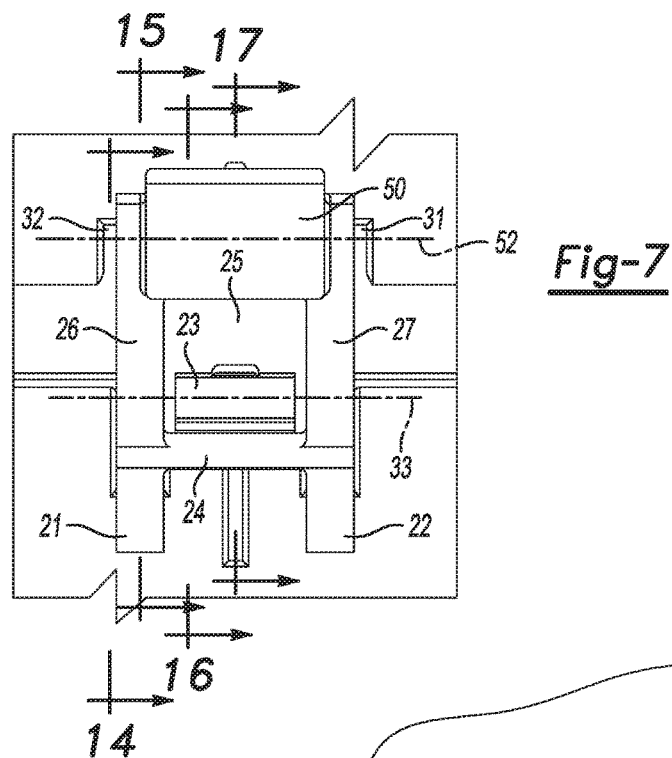
FIG. 7 is a semi-schematic front view of the example of the portion of the injection molded housing depicted in FIG. 5A according to the present disclosure.

FIG. 7 is a semi-schematic front view of the example of the portion of the injection molded housing depicted in FIG. 5A according to the present disclosure. FIG. 7 indicates the views shown in FIG. 14-FIG. 17. FIG. 7 shows the first living hinge 21, the second living hinge 22, the half-knuckle 23, the hinge pin 24, the aperture 25, the first leg 26, the second leg 27, the first retention clip 30, the second retention clip 31, and the thumb lever 50 as described above.

Figure 8:
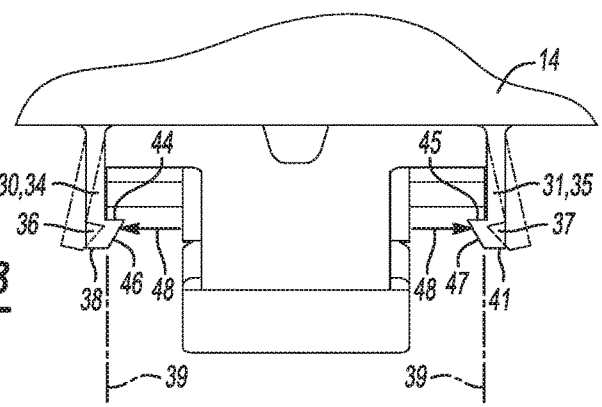
FIG. 8 is a semi-schematic top view of the example of the portion of the injection molded housing depicted in FIG. 5A.

FIG. 8 is a semi-schematic top view of the example of the portion of the injection molded housing 10 depicted in FIG. 5A. Similar to FIG. 5C, FIG. 8 shows the first retention clip 30 and the second retention clip 31 bending side-to-side. FIG. 8 also shows the wall 14, the first retention clip 30, the second retention clip 31, the first pawl 34, the second pawl 35, the first pawl catch 36, the second pawl catch 37, first free end 38, the path 39 of the latch 20, the second free end 41, the first deflector face 46, and the second deflector face 47 as described above.

Figure 9:
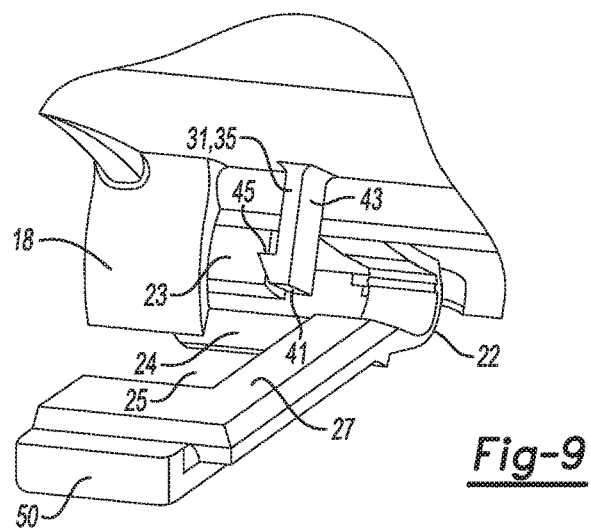
FIG. 9 is a semi-schematic top perspective view of the example of a right half of the portion of the injection molded housing depicted in FIG. 5A.

FIG. 9 is a semi-schematic top perspective view of the example of a right half of the portion of the injection molded housing 10 depicted in FIG. 5A. FIG. 9 shows the the second living hinge 22, the half-knuckle 23, the hinge pin 24, the aperture 25, the second leg 27, the second retention clip 31, the second pawl 35, the second free end 41, the second resilient stem 43, the second pawl catch face 45, and the thumb lever 50 as described above.

Figure 10:
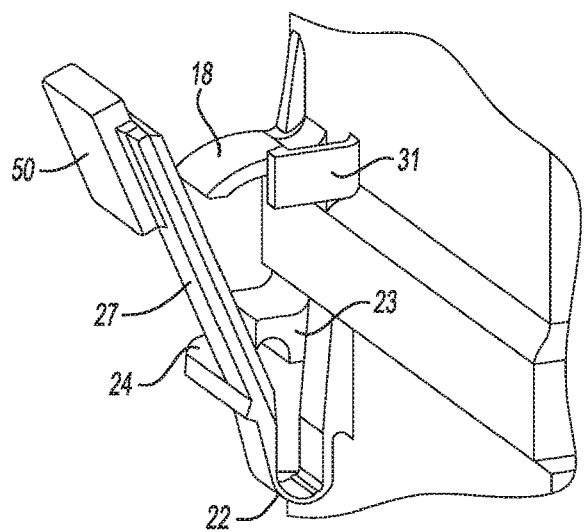
FIG. 10 is a semi-schematic right perspective view of the example of a right half of the portion of the injection molded housing depicted in FIG. 5A.

FIG. 10 is a semi-schematic right perspective view of the example of a right half of the portion of the injection molded housing depicted in FIG. 5A. FIG. 10 shows the central catch 18, the second living hinge 22, the half-knuckle 23, the hinge pin 24, the second leg 27, the second retention clip 31, and the thumb lever 50 as described above.

Figure 11:
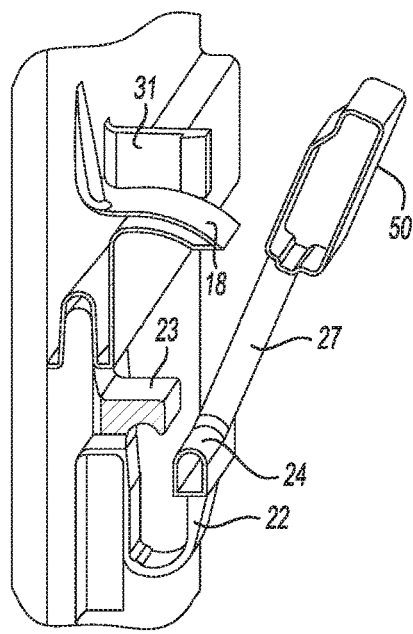
FIG. 11 is a semi-schematic left perspective view of the example of a right half of the portion of the injection molded housing depicted in FIG. 5A.

FIG. 11 is a semi-schematic left perspective view of the example of a right half of the portion of the injection molded housing 10 depicted in FIG. 5A. FIG. 11 shows the central catch 18, the second living hinge 22, the half-knuckle 23, the hinge pin 24, the second leg 27, the second retention clip 31, and the thumb lever 50 as described above. Although the central catch 18, the hinge pin 24, and the thumb lever 50 are shown as hollow in FIG. 11, it should be understood that the central catch 18, the hinge pin 24, and the thumb lever 50 may be solid.

Figure 12:
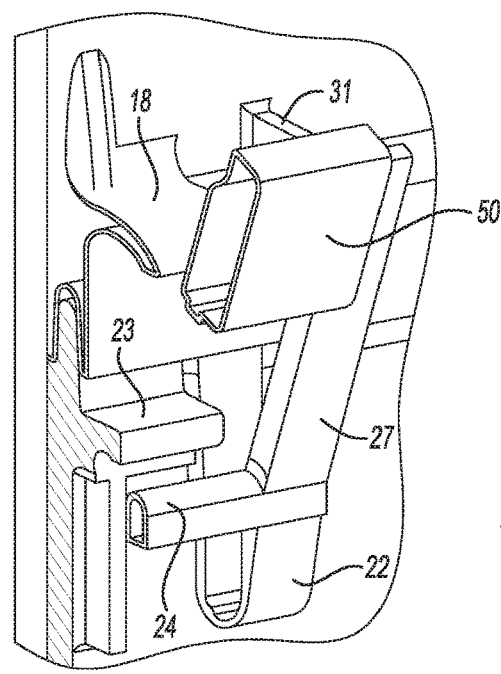
FIG. 12 is a semi-schematic perspective view of the example of a right half of the portion of the injection molded housing depicted in FIG. 5A.

FIG. 12 is a semi-schematic perspective view of the example of a right half of the portion of the injection molded housing 10 depicted in FIG. 5A. FIG. 12 shows the central catch 18, the second living hinge 22, the half-knuckle 23, the hinge pin 24, the second leg 27, the second retention clip 31, and the thumb lever 50 as described above. Although the central catch 18, the hinge pin 24, and the thumb lever 50 are shown as hollow in FIG. 12, it should be understood that the central catch 18, the hinge pin 24, and the thumb lever 50 may be solid.

Figure 13:
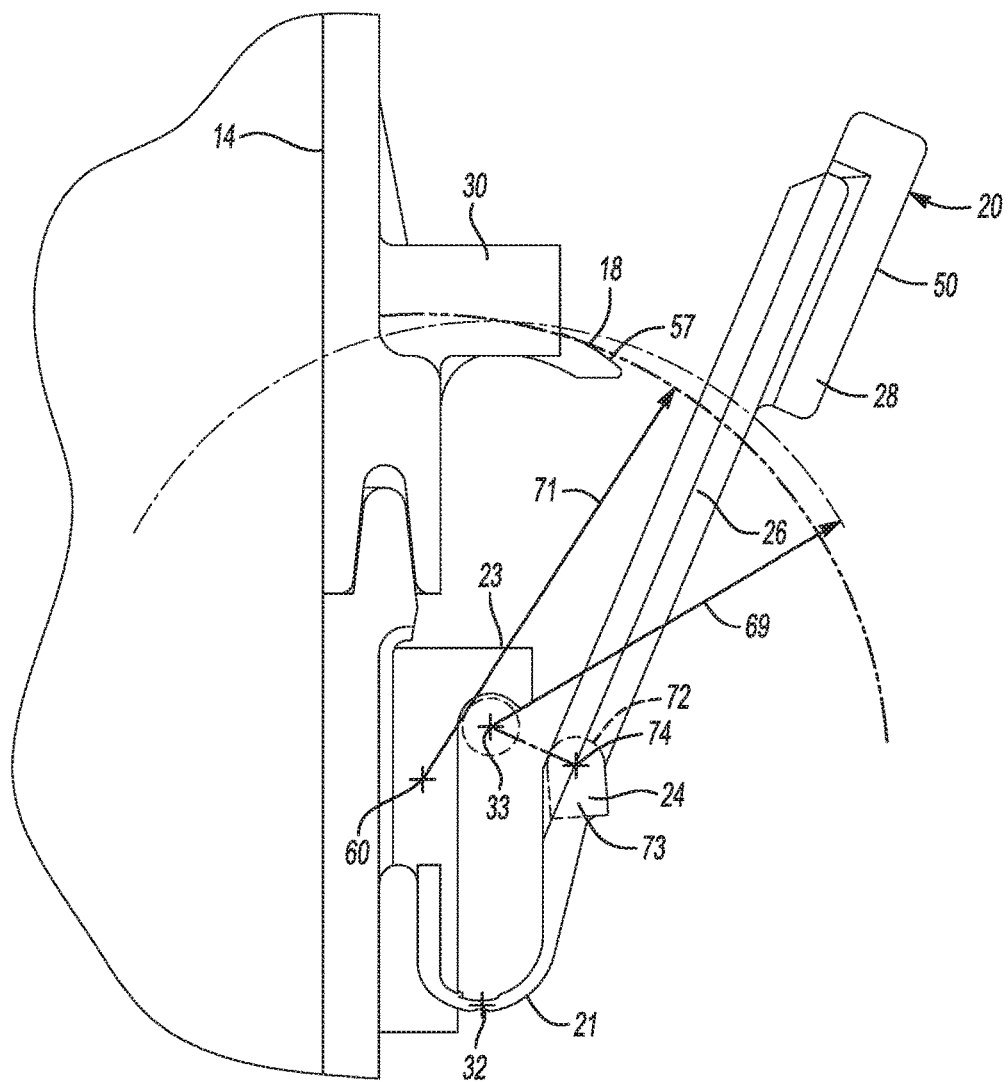
FIG. 13 is a semi-schematic left side view of the example of the portion of the injection molded housing depicted in FIG. 5A.

FIG. 13 is a semi-schematic left side view of the example of the portion of the injection molded housing depicted in FIG. 5A. In the second operational state of the latch 20, the latch 20 is rotatable via the living hinges 21, 22 about a first hinge axis 32 to align the hinge pin 24 with the half-knuckle 23 for engagement therewith.

The central catch 18 is a curved cantilever beam 49 attached to the wall 14. The central catch 18 has a convex surface 57. With the first piece 12 and the second piece 13 seated together, the latch 20 can rotate to engage the central catch 18. The convex surface 57 has a cylindrical contact surface 58 with a cylindrical radius 71 and a center of curvature 60. In the third operational state 66 of the latch 20, the hinge pin 24 is engaged with the half-knuckle 23; the latch 20 is rotatable about a second hinge axis 33, parallel to and spaced from the first hinge axis 32; the second hinge axis 33 is located by the hinge pin 24 engaged with the half-knuckle 23; and the second hinge axis 33 is coaxial to the hinge pin 24. In the example depicted in FIG. 13, the hinge pin 24 has a cylindrical bearing surface 72 and a stiffening rib 73. The cylindrical bearing surface 72 defines a hinge pin axis 74 at a center of the cylindrical bearing surface 72. The stiffening rib 73 projects radially from center of the cylindrical bearing surface 72 to stiffen the hinge pin 24.

The rotation of the latch 20 about the second hinge axis 33 gives a greater mechanical advantage (i.e. the locking force 63 (see FIG. 4C) is lower) for locking the latch 20 compared to rotation about the first hinge axis 32.

In the fourth operational state 67 of the latch 20, the hinge pin 24 is engaged with the half-knuckle 23, the latch 20 is engaged with the central catch 18, and the first retention clip 30 and the second retention clip 31 selectably prevent the latch 20 from disengaging from the central catch 18.

As best seen in FIG. 5A, the thumb lever 50 may be integrally molded with the bridge 28. The thumb lever 50 extends from an end 62 of the bridge 28 opposite to the bridge contact surface 59 to reduce a locking force 63 to move the latch 20 from the third operational state 66 to the fourth operational state 67.

The second hinge axis 33 is spaced from the center of curvature 60 of the cylindrical contact surface 58, and the bridge contact surface 59 rotates about second hinge axis 33 at a smaller radius 69 than the cylindrical radius 71 of the cylindrical contact surface 58. The difference between the radii of curvature 69, 71, and the eccentricity of the second hinge axis 33 relative to the center of curvature 60 of the cylindrical contact surface 58 causes an increase in a clamping force 68 on the abutting surfaces 16, 17 of the first piece 12 and the second piece 13 as the latch 20 is rotated from the cantilever free end 56 of the curved cantilever beam 49 toward the fixed end 55 of the curved cantilever beam 49.

FIGS. 14-17 are semi-schematic cross-sectional views of the example of the portion of the injection molded housing 10 depicted in FIG. 7, with the sections taken as indicated in FIG. 7. FIGS. 14-17 show the first piece 12, the second piece 13, the wall 14, the tongue and groove joint 15, the abutting surfaces 16, 17, the central catch 18, the first living hinge 21, the half-knuckle 23, the hinge pin 24, the first leg 26, the first retention clip 30, the second retention clip 31, and the thumb lever 50 as described above. It should be noted that FIGS. 14-17 show an example of the present disclosure which may advantageously be molded such that the molds create all of the features shown and pull from the top and bottom without requiring slides.

Although the present disclosure has presented detail related to examples implemented in an automotive HVAC application, it is to be understood that the disclosure is not limited to automotive applications or the control of airflow. For example, a flow of water or glycol may be controlled by an example of a valve of the present disclosure. Further, examples of the present disclosure may be applied to residential or commercial building HVAC systems.

It is to be understood that when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

The terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in communication with the other component (notwithstanding the presence of one or more additional components therebetween). Additionally, two components may be permanently, semi-permanently, or releasably engaged with and/or connected to one another.

It is to be further understood that "communication" is to be construed to include all forms of communication, including direct and indirect communication. Indirect communication may include communication between two components with additional component(s) located therebetween.

While several examples have been described in detail, it is to be understood that the disclosed examples may be modified. Therefore, the foregoing description is to be considered non-limiting.

What is claimed is:

1. An injection molded housing, comprising:
    a first piece;
    a second piece;
    a wall defined by the first piece removably joined to the second piece by a joint at abutting surfaces of the first piece and the second piece;
    a central catch integrally molded with the first piece, protruding from the wall;
    a latch integrally molded with the second piece, connected to the second piece by a first living hinge and a second living hinge;
    a half-knuckle integrally molded with the second piece, protruding from the wall; and
    a hinge pin fixedly attached to the latch, wherein the latch is bendable at the living hinges to align the hinge pin with the half-knuckle, and the latch is rotatable about the hinge pin to engage the central catch and selectably prevent the first piece from being disengaged from the second piece;
    wherein:
        the latch includes:
            a first leg extending from the first living hinge;
            a second leg extending from the second living hinge wherein the hinge pin is connected to the first leg and the second leg; and
            a bridge connecting the first leg and the second leg; and
        a first retention clip and a second retention clip are integrally molded with the first piece to allow the latch to engage the central catch and to selectably prevent the latch from disengaging from the central catch.

2. The injection molded housing as defined in claim 1 wherein the joint is a tongue and groove joint.

3. The injection molded housing as defined in claim 1, wherein:
    the latch has a first operational state wherein the first piece is removably joinable to the second piece by the joint at the abutting surfaces of the first piece and the second piece without displacing the latch from a free state;
    the latch has a second operational state wherein the latch is rotatable via the living hinges about a first hinge axis to align the hinge pin with the half-knuckle for engagement therewith;
    the latch has a third operational state wherein the hinge pin is engaged with the half-knuckle, wherein the latch is rotatable about a second hinge axis, parallel to and spaced from the first hinge axis, wherein the second hinge axis is located by the hinge pin engaged with the half-knuckle, and wherein the second hinge axis is coaxial to the hinge pin; and
    the latch has a fourth operational state wherein the hinge pin is engaged with the half-knuckle, the latch is engaged with the central catch, and the first retention clip and the second retention clip selectably prevent the latch from disengaging from the central catch.

4. The injection molded housing as defined in claim 1, wherein:
    the first retention clip includes:
        a first pawl extending from the wall;
        a first pawl catch disposed on a first free end of the first pawl, distal to the wall;
        a first resilient stem defined between the wall and the first pawl catch;
        a first deflector face defined oblique to the path of the latch on the first pawl catch to deflect the first pawl catch from a path of the latch when the latch applies a deflecting force on the first deflector face to resiliently bend the first resilient stem; and
        a first pawl catch face defined orthogonal to the path of the latch on the first pawl catch wherein the first resilient stem urges the first pawl catch to a first blocking position to block movement of the latch in a direction away from the wall; and
    the second retention clip includes:
        a second pawl extending from the wall;
        a second pawl catch disposed on a second free end of the second pawl, distal to the wall;
        a second resilient stem defined between the wall and the second pawl catch;
        a second deflector face defined oblique to the path of the latch on the second pawl catch to deflect the second pawl catch from the path of the latch when the latch applies a deflecting force on the second deflector face to resiliently bend the second resilient stem; and
        a second pawl catch face defined orthogonal to the path of the latch on the second pawl catch wherein the second resilient stem urges the second pawl catch to a second blocking position to block movement of the latch in a direction away from the wall.

5. The injection molded housing as defined in claim 4, wherein:
    the first resilient stem is resiliently bendable in a bending plane;
    the bending plane is parallel to a second hinge axis;
    the second resilient stem is resiliently bendable in the bending plane; and
    the first resilient stem and the second resilient stem are resiliently bendable in opposite directions.

6. The injection molded housing as defined in claim 4, wherein:
    the first resilient stem is resiliently bendable in a first bending plane;
    the first bending plane is orthogonal to the second hinge axis;
    the second resilient stem is resiliently bendable in a second bending plane;
    the second bending plane is parallel to the first bending plane; and
    the first resilient stem and the second resilient stem are resiliently bendable in the same direction.

7. The injection molded housing as defined in claim 3 wherein:
    the central catch is a curved cantilever beam having a fixed end attached to the wall and a cantilever free end distal to the fixed end;
    the central catch has a convex surface;

with the first piece and the second piece seated together, the convex surface has a cylindrical contact surface with a center of curvature;

the convex surface has a curved lead-in surface at the cantilever free end;

the bridge has a bridge contact surface to contact the convex surface; and the bridge is chamfered at a leading edge of the bridge contact surface.

8. The injection molded housing as defined in claim 7, further comprising:

a thumb lever integrally molded with the bridge, the thumb lever extending from an end of the bridge opposite to the bridge contact surface to reduce a locking force to move the latch from the third operational state to the fourth operational state.

9. The injection molded housing as defined in claim 7 wherein the second hinge axis is spaced from the center of curvature of the cylindrical contact surface thereby causing an increase in a clamping force on the abutting surfaces of the first piece and the second piece as the latch is rotated from the cantilever free end of the curved cantilever beam toward the fixed end of the curved cantilever beam.

10. A fastening system, comprising:

a central catch protruding from a first piece of a wall;

a latch connected to a second piece of the wall by a first living hinge and a second living hinge;

a half-knuckle protruding from the second piece of the wall; and a hinge pin fixedly attached to the latch, wherein the latch is bendable at the living hinges to align the hinge pin with the half-knuckle, and the latch is rotatable about the hinge pin to engage the central catch and selectably prevent the first piece from being disengaged from the second piece;

wherein:

the first piece of the wall is removably joined to the second piece by a joint at abutting surfaces of the first piece and the second piece;

the latch includes:

a first leg extending from the first living hinge;

a second leg extending from the second living hinge wherein the hinge pin is connected to the first leg and the second leg; and a bridge connecting the first leg and the second leg; and a first retention clip and a second retention clip are integrally molded with the first piece to allow the latch to engage the central catch and to selectably prevent the latch from disengaging from the central catch.

11. The fastening system as defined in claim 10 wherein the joint is a tongue and groove joint.

12. The fastening system as defined in claim 10, wherein:

the latch has a first operational state wherein the first piece is removably joinable to the second piece by the joint at abutting surfaces of the first piece and the second piece without displacing the latch from a free state;

the latch has a second operational state wherein the latch is rotatable via the living hinges about a first hinge axis to align the hinge pin with the half-knuckle for engagement therewith;

the latch has a third operational state wherein the hinge pin is engaged with the half-knuckle, wherein the latch is rotatable about a second hinge axis, parallel to and spaced from the first hinge axis, wherein the second hinge axis is located by the hinge pin engaged with the half-knuckle, and wherein the second hinge axis is coaxial to the hinge pin; and the latch has a fourth operational state wherein the hinge pin is engaged with the half-knuckle, the latch is engaged with the central catch, and the first retention clip and the second retention clip selectably prevent the latch from disengaging from the central catch.

13. The fastening system as defined in claim 10, wherein:

the first retention clip includes:

a first pawl extending from the wall;

a first pawl catch disposed on a first free end of the first pawl, distal to the wall;

a first resilient stem defined between the wall and the first pawl catch;

a first deflector face defined oblique to the path of the latch on the first pawl catch to deflect the first pawl catch from a path of the latch when the latch applies a deflecting force on the first deflector face to resiliently bend the first resilient stem; and a first pawl catch face defined orthogonal to the path of the latch on the first pawl catch wherein the first resilient stem urges the first pawl catch to a first blocking position to block movement of the latch in a direction away from the wall; and the second retention clip includes:

a second pawl extending from the wall;

a second pawl catch disposed on a second free end of the second pawl, distal to the wall;

a second resilient stem defined between the wall and the second pawl catch;

a second deflector face defined oblique to the path of the latch on the second pawl catch to deflect the second pawl catch from the path of the latch when the latch applies a deflecting force on the second deflector face to resiliently bend the second resilient stem; and a second pawl catch face defined orthogonal to the path of the latch on the second pawl catch wherein the second resilient stem urges the second pawl catch to a second blocking position to block movement of the latch in a direction away from the wall.

14. The fastening system as defined in claim 13, wherein:

the first resilient stem is resiliently bendable in a bending plane;

the bending plane is parallel to a second hinge axis;

the second resilient stem is resiliently bendable in the bending plane; and the first resilient stem and the second resilient stem are resiliently bendable in opposite directions.

15. The fastening system as defined in claim 13, wherein:

the first resilient stem is resiliently bendable in a first bending plane;

the first bending plane is orthogonal to a second hinge axis;

the second resilient stem is resiliently bendable in a second bending plane;

the second bending plane is parallel to the first bending plane; and the first resilient stem and the second resilient stem are resiliently bendable in the same direction.

16. The fastening system as defined in claim 12 wherein:

the central catch is a curved cantilever beam having a fixed end attached to the wall and a cantilever free end distal to the fixed end;

the central catch has a convex surface;

with the first piece and the second piece seated together, the convex surface has a cylindrical contact surface;

the convex surface has a curved lead-in surface at the cantilever free end;

the bridge has a bridge contact surface to contact the convex surface; and the bridge is chamfered at a leading edge of the bridge contact surface.

17. The fastening system as defined in claim 16, further comprising a thumb lever integrally molded with the bridge, the thumb lever extending from an end of the bridge opposite to the bridge contact surface to reduce a locking force to move the latch from the third operational state to the fourth operational state.

18. The fastening system as defined in claim 16 wherein the second hinge axis is spaced from the center of curvature of the cylindrical contact surface thereby causing an increase in a clamping force on the abutting surfaces of the first piece and the second piece as the latch is rotated from the cantilever free end of the curved cantilever beam toward the fixed end of the curved cantilever beam.

* * * * *